INVENTOR.
John A. Sadler
BY~ Maybee & Legris
ATTORNEYS 3,307,176
ELECTRICAL PROTECTION SYSTEM
John Alfred Sadler, Rexdale, Ontario, Canada, assignor to Chubb-Mosler and Taylor Safes Ltd., Brampton, Ontario, Canada, a corporation
Filed Aug. 17, 1964, Ser. No. 389,869
9 Claims. (Cl. 340—411)

This invention relates to an electrical protection system and in particular to an alarm system for connecting a protected premises such as a bank with a monitoring station such as a police station to indicate at the monitoring station that an intursion or an attempted robbery is taking place at the protected premises.

Conventional alarm systems that are used in banks, for example, usually include a protection circuit in a bank and a supervisory circuit in a police station, the two circuits being connected by a telephone line. The protection circuit transmits signals along the telephone line to the supervisory circuit to indicate either that conditions are normal or that a robbery is taking place, and the supervisory circuit is capable of distinguishing between these two conditions. An indicator is provided to indicate to an operator at the police station the existence of normal conditions, a line fault (such as an open or short circuit) or a robbery. Simple systems use a steady direct current signal on the telephone line to indicate that everything is normal, but a potential robber may be able to apply a similar signal anywhere on the telephone line and thereby deceive the system.

This invention proposes the use of a pulsating direct current signal to indicate that everything is normal, and a steady direct current signal to indicate an alarm. It would be difficult for a potential robber to clip, onto the telephone line, an alternative source of pulsating direct current and thereby attempt to deceive the system; for as will be shown he would require a pulsating source of voltage and he would have to know the correct polarity, frequency and width of the pulses. The invention also includes isolation circuits for isolating the protection and supervisory circuits from the telephone line, so that these circuits can be unbalanced without unbalancing the telephone line.

Another feature is the provision of a circuit capable of distinguishing between alternating current and pulsating direct current so that alternating current cannot be used by a potential robber to deceive the system.

An object of the invention is therefore to provide an alarm system that is relatively simple, compact, reliable and which is difficult for a potential robber to deceive.

The invention is illustrated by way of example in the accompanying drawings, in which.

GENERAL DESCRIPTION

Figures 1, 2:
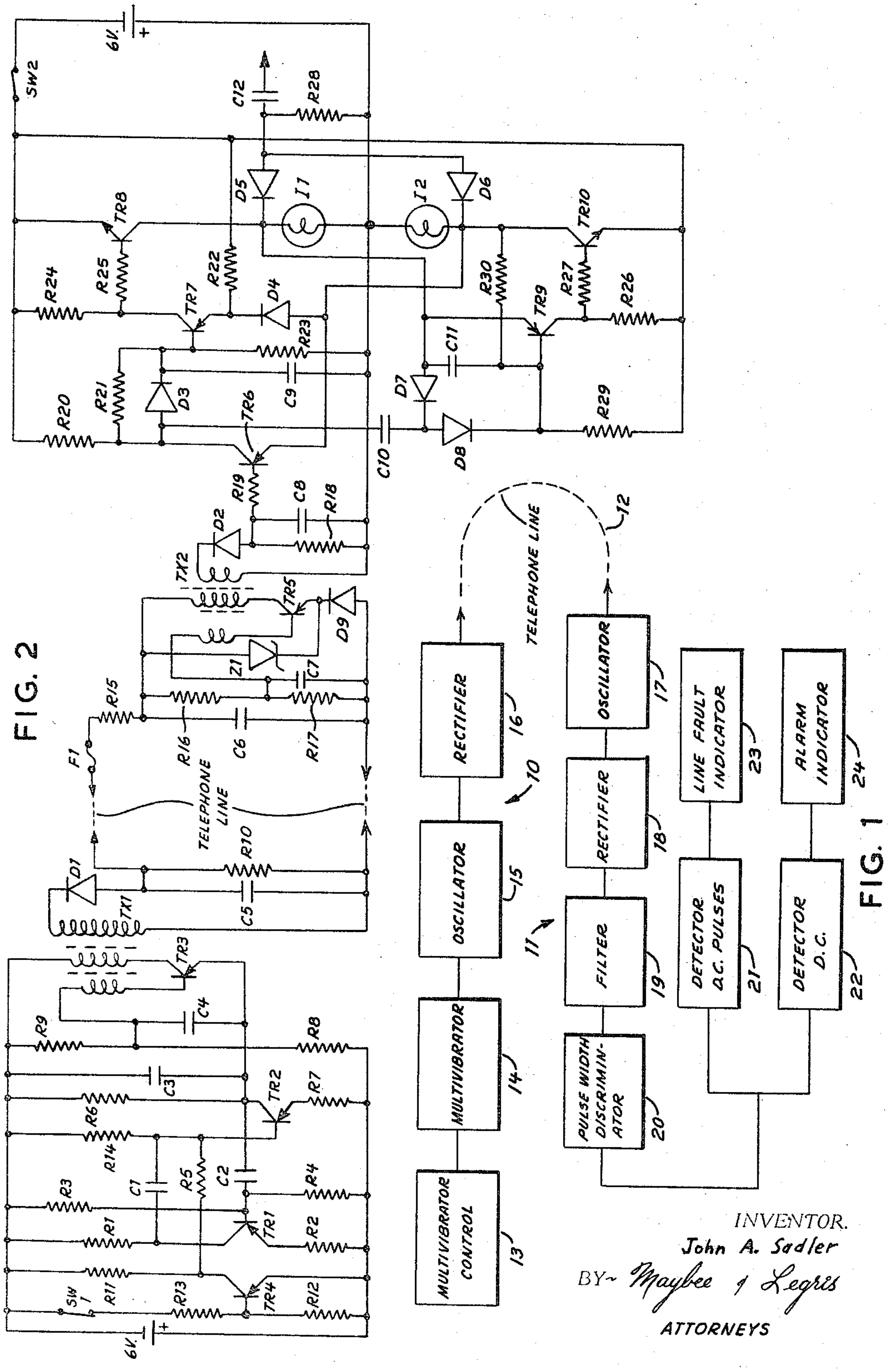
FIG. 1 is a block diagram showing principal elements of the invention.
FIG. 2 is a schematic circuit diagram.

Referring to the drawings and in particular to FIG. 1, an alarm system according to the invention includes a protection circuit 10 and a supervisory circuit 11, the two circuits being connected by a suitable transmission line 12 such as a telephone line. The protection circuit includes a multivibrator control 13, a generator (multivibrator) 14, an oscillator 15 and a rectifier 16. The multivibrator 14 is of the astable kind and it produces square wave pulses of a frequency of preferably between about 3 to 15 cycles per second (c.p.s.).

Low frequencies are preferable because they permit the use of inexpensive telephone lines, but it is to be understood that higher frequencies than those specified above could also be used provided that a telephone line capable of transmitting such higher frequencies is also used.

The multivibrator 14 is isolated from the transmission line 12 by the oscillator 15 and the rectifier 16. The oscillator 15 operates at a relatively high frequency and it is gated by the multivibrator 14. Accordingly, if the frequency of the square waves produced by the multivibrator is 10 c.p.s. and if the frequency of the oscillator is 50,000 c.p.s., then the output of the oscillator consists fo bursts of 50,000 c.p.s., 10 times per second. The gated output of the oscillator 15 is rectified by the rectifier 16 to remove any alternating current component and the wave that appears on the transmission line 12 is therefore substantially a replica in phase, pulse width and frequency of the square waves produced by the multivibrator 14. The multivibrator control 13 under normal conditions permits the multivibrator 14 to oscillate, but under alarm conditions it causes the multivibrator 14 to cease oscillation so that the square waves on the transmission line are replaced with a steady direct current signal.

The supervisory circuit 11 includes an oscillator 17, a rectifier 18, a filter 19, a pulse width discriminator 20, detectors 21 and 22, a line fault indicator 23 and an alarm indicator 24. The oscillator 17 and rectifier 18 function in substantially the same manner as that of the oscillator 15 and rectifier 16 described above. The detector 21 produces a line fault signal if a signal other than the correct pulsating direct current signal reaches it, and the detector 22 produces an alarm signal if direct current appears on the transmission line.

The oscillators 15 and 17 serve an important function, namely to isolate the rest of the alarm system (which is unbalanced) from the transmission line. If an unbalanced circuit is connected directly to a balanced line (such as a telephone line) the line becomes unbalanced and undesirable relatively high voltages might develop on it. Transformers can be used to isolate the system, but at these low frequencies such transformers are very large and relatively expensive. By using oscillators operating at a relatively high frequency, associated transformers and coupling capacitors can be relatively small and inexpensive.

The filter 19 and the pulse width discriminator 20 (shown only in FIG. 1) provide further security against intended robbers. The filter 19 is tuned to the multivibrator frequency and the pulse width discriminator 20 is adapted to pass pulses of a predetermined width only. The filter 19 and the pulse width discriminator 20 circuits are conventional. Thus, in order to attempt to deceive the system, an intended robber would have to known that direct current pulses were used to indicate normal conditions in the system and he would also have to know the frequency, the pulse width and the polarity of the pulses.

ELECTRONIC CIRCUIT

1. *Protection circuit*

Referring now to FIG. 2, the multivibrator 14 is a two stage capacitance coupled common emitter transistor amplifier with the output of the first stage (TR1) coupled to the input of the second stage (TR2) and the output of the second stage coupled to the input of the first stage. Coupling between the transistors TR1 and TR2 is provided by capacitors C1 and C2; resistors R14 and R3 are provided to aid starting and resistors R2 and R7 provide stabilization. Resistors R1 and R6 are the respective collector load resistors for the transistors TR1 and TR2, and resistor R4 provides base bias stabilization for the transistor TR1.

The multivibrator control consists of a transistor TR4 which conducts when switch SW1 is closed. When the switch SW1 is opened, base current through the transistor TR4 ceases and the transistor TR4 is thereupon cut off; resistor R12 ensures that the transistor TR4 is cut off. The collector potential of the transistor TR4 then rises towards negative supply voltage, whereupon current flows through resistor R11, resistor R5 and the base-emitter junction of the transistor TR2. Thus, the transistor TR2 conducts continuously when the switch SW1 is open. When the switch SW1 is closed, the transistors TR1 and TR2 resume oscillating. Resistor R13 provides base bias for the transistor TR4 when the switch SW1 is closed. The switch SW1 constitutes an "alarm" switch and its function will be further described.

The oscillator consists of a transistor TR3 connected to a transformer TX1 having a feedback winding, a primary winding and a secondary winding. The feedback winding is in the base circuit and the primary winding is in the collector circuit of the transistor TR3. A positive voltage of sufficient magnitude on the emitter of the transistor TR3 causes it to oscillate. Capacitors C3 and C4 are high frequency by-passes and resistors R8 and R9 provide the proper bias for the transistor TR3 to ensure that the oscillations start and stop when positive voltage is switched on and off the emitter of the transistor TR3. The frequency of the oscillator is not critical. Frequencies of between about 30,000 to 100,000 c.p.s. are suitable; a frequency of 50,000 c.p.s. has been found to be convenient. Lower frequencies require a larger transformer and higher frequencies require a very small transformer, so a frequency of 50,000 c.p.s. is a good compromise.

When the multivibrator is oscillating, the transistor TR2 alternately conducts and is cut off, and since it is in series with the transistor TR3 it causes it to oscillate in bursts of (for example) 50,000 c.p.s. 10 times per second. If, however, the switch SW1 is opened, the transistor TR2 conducts continuously and the transistor TR3 oscillates continuously.

The secondary winding of the transformer TX1 is connected to a rectifier D1 the output of which is filtered by a capacitor C5 and is fed to the transmission line. A resistor R10 is provided to discharge the capacitor C5. Thus, when the transistor TR3 oscillates in bursts, pulsating direct current appears on the transmission line, and when it oscillates continuously, steady direct current appears on the transmission line. The rectifier D1 is so oriented that negative direct current appears at the junction between it and the capacitor C5. The rectifier can of course be reversed so that positive direct current appears at the above junction, but if this is done the transmission line leads at the input of the supervisory circuit must be reversed.

2. *Supervisory circuit*

Incoming signals are fed from the transmission line to the oscillator 17 which is similar (with one exception) to the oscillator 15; it oscillates when a voltage of correct polarity is applied to it. The oscillator 17 includes a transistor TR5 and a transformer TX2 and it is powered by the signals on the line produced by the protection circuit, so that the signals which appear across resistor R18 are similar to the signals impressed on the transmission line by the protection circuit. A fuse F1, a resistor R15 and a zener diode Z1 protect the transistor TR5 from transient voltages that may appear across the transmission line; capacitor C6 is a high frequency by-pass.

A diode D9 and a large by-pass capacitor C7 are provided in the oscillator 17 circuit (the exception noted above). The diode D9 provides reverse bias for the transistor TR5 so that the oscillator 17 stops when the voltage on the transmission line drops to a low level. The capacitor C7 performs a dual function; as well as serving as a high frequency by-pass, it is used to stop the transistor TR5 from oscillating if an intended robber attempts to deceive the system by applying alternating current (from the mains, for example) to the transmission line. This is accomplished in the following manner.

Assuming alternating current is on the transmission line, the capacitor C7 charges quickly to full line potential through the transformer TX2 and the forward biased collector base diode of the transistor TR5, during the positive half cycle (i.e. when the fuse F1 side of the transmission line is positive).

During the negative half cycle, the capacitor C7 discharges slowly through resistors R16 and R17 but it does not completely discharge. Consequently, the transistor TR5 is reverse biased during both positive and negative half cycles and therefore does not oscillate when alternating current is applied to the transmission line.

Signals which appear at the junction of the rectifier D2 and the resistor R18 are fed through a resistor R19 to the base of a transistor TR6. Capacitor C8 is a high frequency by-pass. The transistor TR6 alternately conducts and is cut off so its collector varies from positive supply potential to negative supply potential. This voltage swing is fed through capacitor C10, used to block direct current, to rectifiers D7 and D8 which are connected in a voltage doubler arrangement. Capacitor C11 is charged by the output of the rectifier D8 so that the base of transistor TR9 is held positive with respect to its emitter and it is therefore cut off. The collector of the transistor TR9 remains at negative supply potential so that transistor TR10 (of the NPN kind) has no base drive. The transistor TR10 thus remains cut off so long as positive bias is applied to the base of the transistor TR9 by the rectifier D8. A lamp I2 (alarm indicator) in the collector circuit of the transistor TR10 is not illuminated when the transistor TR10 is cut off. Resistor R29 provides a direct current return for the base of the transistor TR9 and resistor R26 serves as a collector load resistor for the transistor TR9. The transistors TR9 and TR10 and associated circuitry constitute the detector 22 referred to above.

The collector of the transistor TR6 is also connected to the base of transistor TR7 through a rectifier D3 and resistor R21. When the collector of the transistor TR6 becomes negative, capacitor C9 slowly starts to charge through resistors R20 and R21. When the collector of the transistor TR6 becomes positive, the capacitor C9 discharges quickly through the rectifier D3 and the transistor TR6. Under normal conditions, when direct current pulses from the protection circuit are received by the supervisory circuit, the voltage across the capacitor C9 remains relatively low so that the transistor TR7, which is reverse biased by rectifier D4 and resistor R22, remains cut off. Transistor TR8, which is driven by the transistor TR7 through resistor R25, then has no base drive and so lamp I1 (line fault indicator) in its collector circuit is not illuminated. Resistor R24 provides a load for the collector of the transistor TR7. The transistors TR7 and TR8 constitute the detector 21 referred to above.

The operation of the system during alarm conditions and during normal and line fault conditions will now be described.

When the switch SW1 is opened an alarm signal (a direct current signal) is fed from the protection circuit to the supervisory circuit. The output of the rectifier D2 remains constant and the transistor TR6 conducts continuously. The capacitor C9 cannot charge under these conditions so the transistors TR7 and TR8 remain cut off and the lamp I2 is not illuminated. Since the transistor TR6 conducts continuously under alarm conditions, there can be no voltage output from the voltage doubler (rectifiers D7 and D8). Capacitor C11 discharges through the resistor R29 and the lamp I1. Eventually the capacitor C11 begins to charge (in a direction opposite to the usual when it is charged through the rectifier D8) through the resistor R29, and base current then flows through the transistor TR9 thereby causing it to conduct. The transistor TR10, driven by the transistor TR9 through resistor R27, begins to conduct and the current flowing in its collector circuit causes the lamp I2 to become illuminated. A feedback resistor R30 supplies base current to the transistor TR9 causing it to conduct continuously. Accordingly, the transistor TR10 is locked in the conducting condition and the lamp I2 remains illuminated continuously. The lamp I2 is also connected to the emitter of the transistor TR6 and through the rectifier D4 to the emitter of the transistor TR7. When the lamp I2 is illuminated, the transistors TR6 and TR7 are reverse biased so that the lamp I1 cannot become illuminated.

If the direct current pulses from the protection circuit should, for any reason, cease to be received by the supervisory circuit (for example if the transmission line should become open or short circuited) then the transistor TR5 cannot oscillate, the rectifier D2 will provide no output and the transistor TR6 will accordingly be cut off.

The capacitor C9, serving as a time delay, can now charge through the resistor R20 and R21. When the voltage across the capacitor C9 becomes higher than the emitter voltage of the transistor TR7, base current from the resistors R20 and R21 will flow through the transistor TR7, causing it to conduct. The transistor TR8, driven by the transistor TR7, also begins to conduct and the lamp I1 is illuminated. The emitter of the transistor TR9 is connected to the lamp I2 so that when the lamp I1 is illuminated, the transistor TR9 is reverse biased and the lamp I2 cannot become illuminated. If it is required that the lamp I1 lock on, the positive side of resistor R23 should be connected to the collector of the transistor TR8. The resistor R23 will then supply feedback current to the transistor TR7 so that the lamp I1 will remain illuminated even when normal conditions are restored.

When direct current pulses are not received by the supervisory circuit, the transistor TR6 is cut off, as indicated above. Accordingly, there is then no voltage output from the voltage doubler (rectifiers D7 and D8) so the lamp I2 should become illuminated. However, the relative time delays provided by the capacitor C9 (line fault circuit) and the capacitor C11 (alarm circuit) are such that the lamp I1 will become illuminated first. As indicated above, if the lamp I1 is illuminated first then the lamp I2 cannot be illuminated.

A switch SW2, in the negative lead of the power supply, is used to reset both the lamps I1 and I2.

Diodes D5 and D6 provide an output pulse through a coupling capacitor C12 when either of the lamps I1 and I2 is illuminated. This signal can be used to trip an audio alarm such as a bell. When the lamps are reset, resistor R28 discharges the capacitor C12 so that it is ready for the next output signal.

Power for both the protection circuit and the supervisory circuit can be conveniently supplied by batteries.

Preferred values (for battery voltage of six volts) of the above-identified components are listed below:

RESISTORS (Resistance in ohms, K=1000)

| | |
|---|---|
| R1, R11, R18, R19, R20 | 2.2K |
| R2 | 1K |
| R3, R14, R28 | 47K |
| R4, R6, R8, R12, R13, R17, R23 | 4.7K |
| R5 | 3.9K |
| R7 | 100 |
| R9, R16, R21, R22, R30 | 10K |
| R10 | 33K |
| R15 | 470 |
| R24, R26 | 1.5K |
| R25, R27 | 390 |
| R29 | 22K |

CAPACITORS (Capacity in microfarads)

| | |
|---|---|
| C1, C2 | 32 |
| C4 | 0.02 |
| C7 | 100 |
| C8 | 0.2 |
| C9 | 320 |
| C10, C12 | 100 |
| C3, C5, C6 | 0.1 |
| C11 | 500 |

TRANSISTORS AND DIODES

| | |
|---|---|
| TR1, TR4, TR6, TR7, TR9 | 2N2428. |
| TR2, TR3, TR5 | 2N2431. |
| TR8, TR10 | 2N1304. |
| D1, D2, D3, D5, D6, D7, D8 | 1N191. |
| D4, D9 | Phillips Electric part No. BA–100 (50 milliampere silicone diode). |
| Z1 | Any 15 volt zener diode. |

TRANSFORMERS

Transformers TX1 and TX2 are wound on identical ferrite cores, having a cross sectional area of about 3/16 square inch.

| | Turns |
|---|---|
| TX1: | |
| Feedback winding | 18 |
| Collector winding | 90 |
| Secondary winding | 120 |
| TX2: | |
| Feedback winding | 20 |
| Collector winding | 150 |
| Output winding | 30 |

What I claim as my invention is:

1. An electrical protection system comprising a protection circuit at a protected area; a supervisory circuit at a monitoring station; a transmission line connecting the protection circuit to the supervisory circuit; the protection circuit including a generator for transmitting to the supervisory circuit via the transmission line a first signal comprising direct current pulses to indicate a normal condition of the system, and means for replacing the first signal with a second signal comprising steady direct current to indicate an alarm condition; and the supervisory circuit including a first detector for receiving the first signal and adapted to produce a line fault signal upon cessation of reception by the supervisory circuit of the first signal, and a second detector for producing an alarm signal upon reception by the supervisory circuit of the second signal.

2. An electrical protection system as claimed in claim 1 wherein the first signal comprises direct current pulses of predetermined polarity.

3. An electrical protection system as claimed in claim 1 wherein the first signal comprises direct current pulses of predetermined frequency and pulse width and the supervisory circuit includes a filter and a pulse width discriminator to pass said pulses of predetermined frequency and pulse width only.

4. An electrical protection system as claimed in claim 1 wherein the generator is an astable multivibrator having a frequency of between about 3 to 15 cycles per second.

5. An electrical protection system as claimed in claim 1 wherein the supervisory circuit includes a circuit interposed between the first detector and the transmission line for activating the first detector and thereby forming a line fault signal upon reception by the said interposed circuit of an alternating current wave on the transmission line.

6. An electrical protection system comprising a protection circuit at a protected area; a supervisory circuit at a monitoring station; a transmission line connecting the protection circuit to the supervisory circuit; the protection circuit including a generator for producing a first signal comprising direct current pulses of relatively low frequency to indicate a normal condition of the system and a first isolation circuit for isolating the generator from the transmission line and adapted to transmit to the supervisory circuit via the transmission line a second sigal that is similar to the first signal, said first isolation circuit comprising a relatively high frequency first oscillator that is gated by the first signal, and a first rectifier to rectify the gated output of the first oscillator, the output of the first rectifier constituting the second signal; the supervisory circuit including a detector that is adapted to produce a line fault signal upon cessation of reception by the supervisory circuit of the second signal, and a second isolation circuit for isolating the detector from the transmission line comprising a relatively high frequency second oscillator that is gated by the second signal and a second rectifier to rectify the gated output of the second oscillator, the detector being fed by the second rectifier.

7. An electrical protection system as claimed in claim 6 wherein the generator is an astable multivibrator having a frequency of between about 3 to 15 cycles per second.

8. An electrical protection system as claimed in claim 7 wherein the first and second oscillators have a frequency of between about 30,000 to 100,000 cycles per second.

9. An electrical protection system comprising a protection circuit at a protected area; a supervisory circuit at a monitoring station; a transmission line connecting the protection circuit to the supervisory circuit; the protection circuit including a generator for producing a first signal comprising direct current pulses of relatively low frequency to indicate a normal condition of the system, a first isolation circuit for isolating the generator from the transmission line and adapted to transmit to the supervisory circuit via the transmission line a second signal that is similar to the first signal, said first isolation circuit comprising a relatively high frequency first oscillator that is gated by the first signal, and a first rectifier to rectify the gated output of the first oscillator, the output of the first rectifier constituting the second signal, and means for replacing the first signal with a third signal comprising steady direct current to indicate an alarm condition; the supervisory circuit including a first detector that is adapted to produce a line fault signal upon cessation of reception by the supervisory circuit of the second signal, and a second isolation circuit for isolating the first detector from the transmission line, comprising a relatively high frequency second oscillator that is gated by the second signal and a second rectifier to rectify the gated output of the second oscillator, the first detector being fed by the second rectifier, and a second detector for producing an alarm signal upon reception by the supervisory circuit of the third signal.

References Cited by the Examiner

UNITED STATES PATENTS 2,869,909 8/1954 Poulson ------------ 340—276

FOREIGN PATENTS 803,219 10/1958 Great Britain.

NEIL C. READ, *Primary Examiner.*

D. L. TRAFTON, *Assistant Examiner.*